(12) United States Patent
Carson et al.

(10) Patent No.: US 11,407,572 B2
(45) Date of Patent: Aug. 9, 2022

(54) SEASONING PRODUCT PACKAGE (71) Applicant: Occo Co., New York, NY (US)

(72) Inventors: Lisa Lorraine Carson, New York, NY (US); Connie Wang, New York, NY (US)

(73) Assignee: OCCO CO., New York, NY (US)

( * ) Notice: Subject to any disclaimer, the term of this patent is extended or adjusted under 35 U.S.C. 154(b) by 7 days.

(21) Appl. No.: 16/945,894

(22) Filed: Aug. 2, 2020

(65) Prior Publication Data

US 2021/0101731 A1    Apr. 8, 2021

Related U.S. Application Data

(60) Provisional application No. 62/910,658, filed on Oct. 4, 2019.

(51) Int. Cl.
   *B65D 77/20*    (2006.01)
   *B65D 85/00*    (2006.01)
   *B65D 77/22*    (2006.01)

(52) U.S. Cl.
   CPC .......... *B65D 77/204* (2013.01); *B65D 77/22* (2013.01); *B65D 85/70* (2013.01); *B65D 2577/205* (2013.01)

(58) Field of Classification Search
   CPC ......... A47G 21/00; A47G 21/004; A61J 7/00; A61J 7/0023; A61J 7/0053; B65D 25/08; B65D 75/58; B65D 77/20; B65D 77/204; B65D 77/22; B65D 85/70; B65D 2577/205; B65D 85/00; B65D 77/2056
   USPC ........................... 426/106–130; 206/219–222
   See application file for complete search history.

(56) References Cited

U.S. PATENT DOCUMENTS

| 2,647,681 | A | * | 8/1953 | Paoli | ................. | B65D 81/3272 |
|||||||206/219|
| 3,360,121 | A | * | 12/1967 | Zoeller | ................. | B65D 81/00 |
|||||||206/216|
| 4,863,036 | A |  | 9/1989 | Heijenga | | |
| 4,875,620 | A |  | 10/1989 | Lane, Sr. | | |
| 4,903,842 | A | * | 2/1990 | Tokuda | ................. | B32B 27/06 |
|||||||206/222|
| 5,125,529 | A |  | 6/1992 | Torterotot | | |
| 6,408,598 | B1 |  | 6/2002 | Stockley, III | | |

(Continued)

FOREIGN PATENT DOCUMENTS

| JP | 2013129447 A | * | 7/2013 | ............. B65D 77/20 |
| JP | 201943661 A | * | 3/2019 | ............. B65D 77/20 |
| WO | 2009011571 A1 |  | 1/2009 | |

OTHER PUBLICATIONS

International Search Report and Written Opinion of the International Searching Authority, PCT/US202054321, dated Jan. 26, 2021.

*Primary Examiner* — Bryon P Gehman
(74) *Attorney, Agent, or Firm* — Troutman Pepper Hamilton Sanders LLP (57) ABSTRACT

This disclosure provides a package for a product, including a capsule body configured to accommodate a predetermined amount of the product; a handle connected to one side of the capsule body; and a lid, wherein the capsule body is sealed with the lid. The capsule body, the handle, and the lid are made of an oxygen-proof, lightproof, moisture-proof, and sustainable material, e.g., aluminum. A modified atmosphere packaging technique is used during the packaging process to extend shelf life.

20 Claims, 8 Drawing Sheets

(56) References Cited

U.S. PATENT DOCUMENTS

| | | | |
|---|---|---|---|
| 6,595,110 B1* | 7/2003 | Huang | A47G 19/16 |
| | | | 206/216 |
| 8,420,140 B2* | 4/2013 | Nafisi-Movaghar | ......... |
| | | | B65D 81/2076 |
| | | | 426/107 |
| 8,898,912 B2* | 12/2014 | Leffler | A61J 7/0023 |
| | | | 30/326 |
| 8,919,594 B2* | 12/2014 | Teys | A47G 21/004 |
| | | | 220/268 |
| 9,187,225 B2* | 11/2015 | Barton | B65D 75/566 |
| 10,688,260 B2* | 6/2020 | Gjertsen | A61M 15/0061 |
| 10,807,782 B2* | 10/2020 | Sanfilippo | B65D 77/2056 |
| 2008/0302678 A1 | 12/2008 | Hunswick et al. | |
| 2010/0300901 A1* | 12/2010 | Perell | B65B 5/026 |
| | | | 206/205 |
| 2015/0166257 A1 | 6/2015 | Trombetta | |
| 2019/0106258 A1 | 4/2019 | Sanfilippo et al. | |
| 2021/0094744 A1* | 4/2021 | Benson | B65D 75/5838 |
| 2021/0139216 A1* | 5/2021 | Sutherland | B65D 83/0055 |

\* cited by examiner

SEASONING PRODUCT PACKAGE

CROSS-REFERENCE TO RELATED APPLICATIONS

This application claims priority to U.S. provisional application Ser. No. 62/910,658 filed Oct. 4, 2019 which is incorporated herein by reference in its entirety.

TECHNICAL FIELD

The present disclosure relates generally to a package for a product in a form of a flake, a powder, or a grain. More particularly, the present disclosure relates to a food package, e.g., a seasoning package used for keeping the seasoning fresh with a long shelf life.

BACKGROUND

Generally, seasoning, such as spices, herbs, condiments, etc., are sold in jars containing an amount that is much more than an amount that customers need for cooking, baking, or other general consumption. However, ground seasonings begin to lose freshness and flavor within 3-6 months, because essential oils, which give the seasonings taste, scent, and color, are exposed to oxygen, light, and moisture, and become susceptible to oxidation and degradation. Specifically, a traditional jar has to be opened and closed for seasoning usage. Each time the jar is opened and closed, all the seasoning inside the jar is subject to oxygen, light, and moisture, leading to a shorter optimal shelf life (i.e., 3-6 months). Additionally, the jars of seasoning are generally placed close to or on top of a stove, and the heat of the stove can further reduce the shelf life of the seasoning in the jars. Considering the limited shelf life of jars of seasoning, a large amount of seasoning in jars is a waste for customers who value cooking with fresh and flavorful seasoning every time they prepare a meal.

Further, pod capsules and blister packs have been introduced for food storage and protection. The most common material used for pod capsules and food blister packs is plastic. Conventional plastic cannot work as a perfect oxygen, light, or moisture barrier, and as a result, food products packaged in plastic pod capsules and blister packs generally have limited shelf life. Further, the plastic can only be recycled a limited number of times (i.e., 1-2 times), with material function degrading over each cycle of reuse.

SUMMARY

Embodiments provide a package for a product, comprising: a capsule body configured to accommodate a predetermined amount of the product; a handle connected to one side of the capsule body; and a lid, wherein the capsule body is sealed with the lid.

Embodiments further provide a package, wherein the capsule body, the handle, and the lid are made of an oxygen-proof, lightproof, moisture-proof, and sustainable material, e.g., aluminum.

Embodiments further provide a package, wherein the product is seasoning.

Embodiments further provide a package, wherein the handle includes a recess, configured to receive a portion of a thumb of a user.

Embodiments further provide a package, wherein the lid includes a peel tab, extending outwards on top of the handle to form an overhang portion.

Embodiments further provide a package, wherein a bottom of the capsule body is flat.

Embodiments further provide a package, wherein the capsule body and the lid are sealed using a modified atmosphere packaging technique.

Embodiments provide a seasoning package, comprising: a capsule body configured to accommodate a predetermined amount of seasoning; a handle connected to one side of the capsule body; and a lid, wherein the capsule body is sealed with the lid.

Embodiments provide a seasoning package, comprising: a capsule body configured to accommodate a predetermined amount of seasoning; a handle connected to one side of the capsule body; and a lid, wherein the capsule body is sealed with the lid. The capsule body, the handle, and the lid are made of aluminum, wherein the lid includes a peel tab, extending outwards on top of the handle to form an overhang portion.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
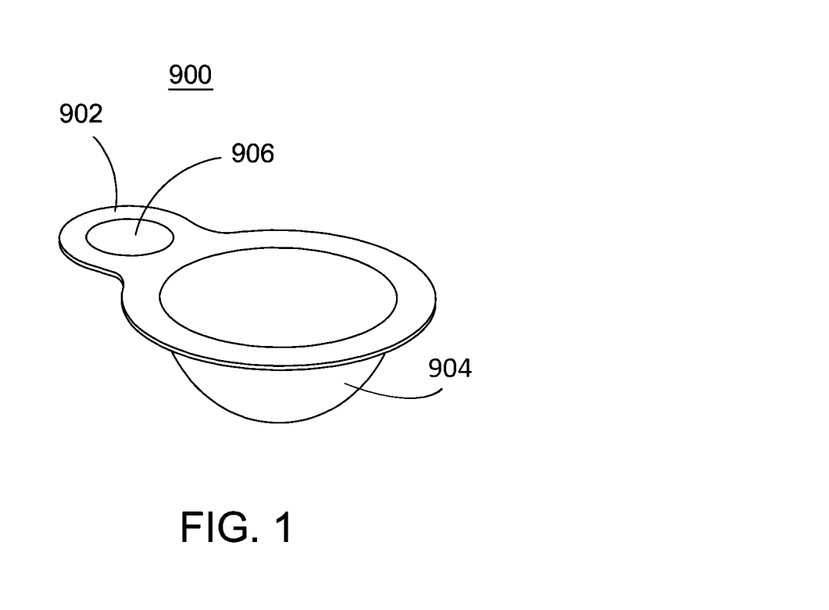
FIG. 1 depicts a perspective view of one illustrative embodiment of a capsule.
Figure 2:
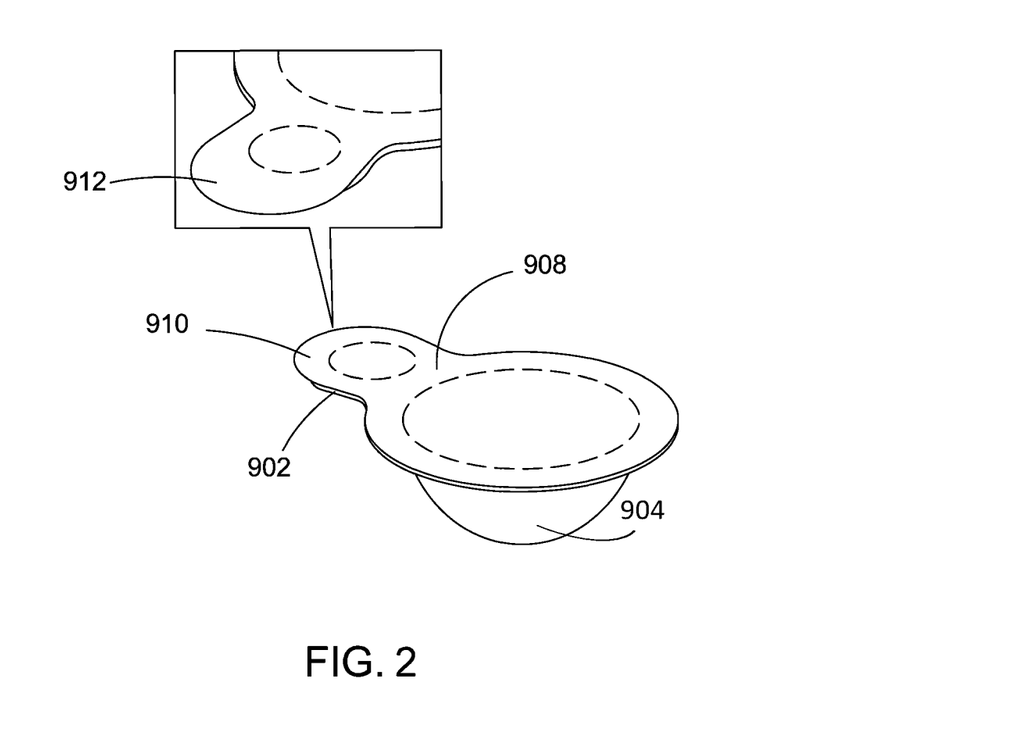
FIG. 2 depicts a perspective view of one illustrative embodiment of a capsule with a lid.
Figure 3:
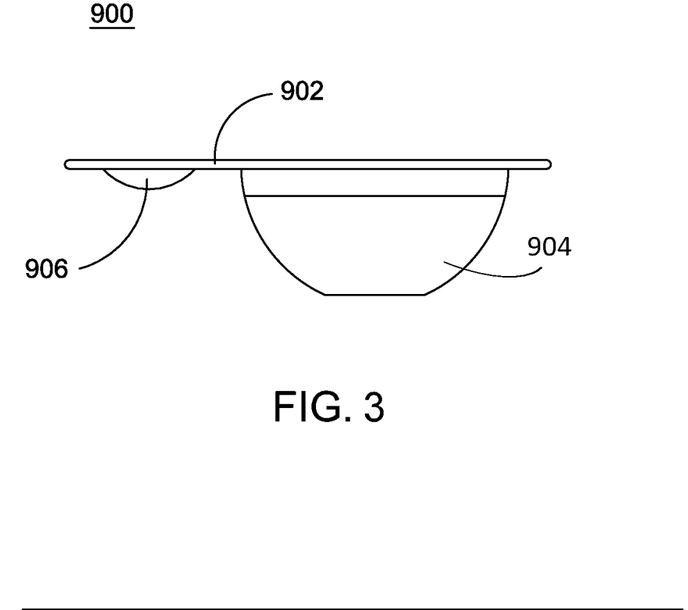
FIG. 3 depicts a side view of one illustrative embodiment of a capsule.

Referring to FIGS. 1-5, embodiments of the present invention provide a package for a product in a form of a flake, a powder, or a grain. In an embodiment, the package can hold a food product. For instance, a food package is an individual single-use capsule 900 holding a pre-measured portion of a food product, e.g., a fine-grained food powder. In an embodiment, the bottom of the capsule 900 is flat. The capsule 900 includes a handle 902 located on a side of the capsule body 904. In an embodiment, the handle 902 includes a recess 906 for ergonomic consideration. When holding the handle 902 of the capsule 900, a thumb can be put at the recess 906 position, so that the thumb can securely hold the handle 902 without slipping. A lid 908 is attached to the top of the capsule 900 to seal the food product inside the capsule 900. The capsule 900 is made of an oxygen-proof, lightproof, moisture-proof, and sustainable material, such as aluminum, and the lid 908 is a foil made of an oxygen-proof, lightproof, moisture-proof and sustainable material, such as aluminum foil. The capsule 900 and the lid 908 are sealed with a modified atmosphere packaging technique to ensure that the food product inside the capsule 900 stays fresher for longer. In an embodiment, as shown in FIG. 2, the lid includes a peel tab 910, which extends slightly outwards on top of the handle 902 to form an overhang 912, so as to allow for easier opening of the lid 908. In an embodiment, the lid 908 is printed with information to inform the customer which seasoning, for example, curry, cinnamon, or garlic, etc., is kept in this seasoning package 900.

Figure 4:
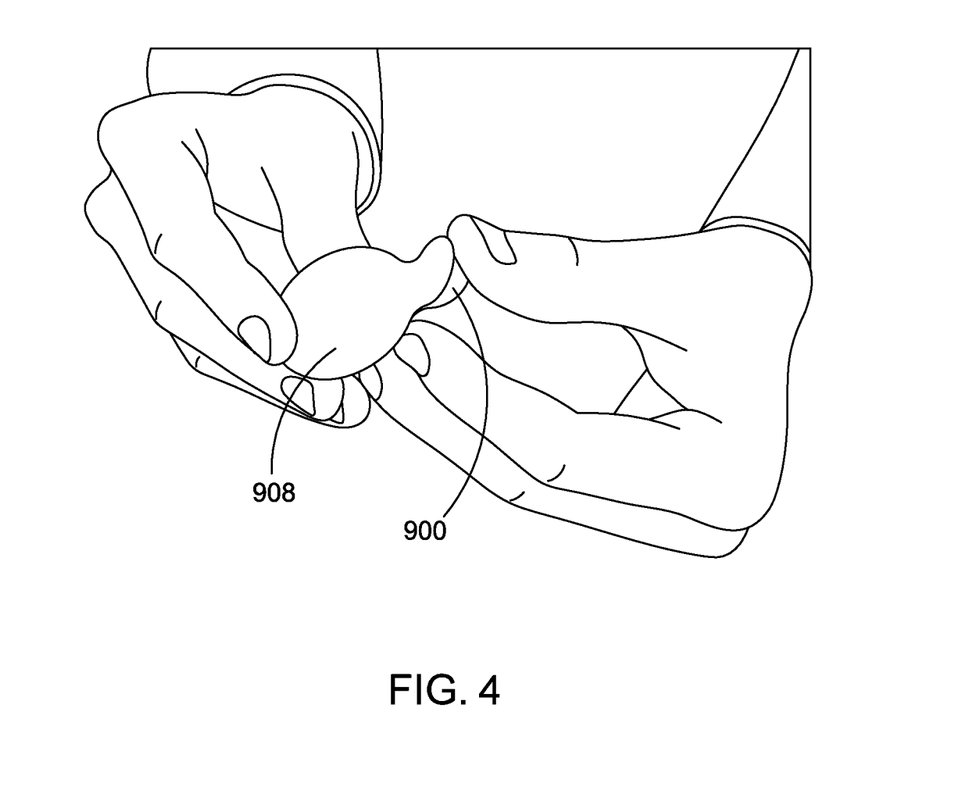
FIG. 4 depicts a diagram illustrating a step of opening the lid of an exemplary capsule.
Figure 5:
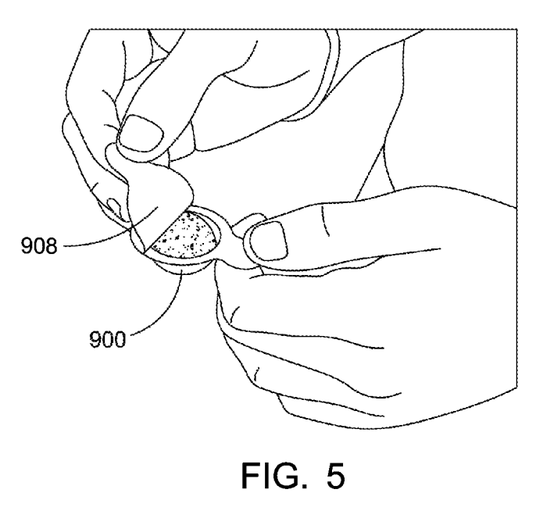
FIG. 5 depicts a diagram illustrating a step of opening the lid of an exemplary capsule, showing seasoning inside the seasoning capsule.

In an embodiment, the individual seasoning package can be opened with the following steps. First, as shown in FIG. 4, a lid 908 is separated from a handle of a capsule 900. A user can hold the capsule 900 with one hand, and pull a part of the lid 908 up with a thumb of the other hand. Second, as shown in FIG. 5, the user can pull the lid 908 backward with the thumb and the index finger of one hand, so that the lid 908 can be peeled away from the capsule 900. The food product inside the capsule 900 is revealed gradually when the lid 908 is being peeled away from the capsule 900.

In an embodiment, the individual seasoning package can be manufactured with the following steps.

First, one or more empty capsules 900 are pressure-cut from a sheet of rigid and food-grade aluminum foil using a capsule-shaped mold. The die-cut edge around each capsule is then rolled, so that the edge is smooth.

Second, one or more lids 908 are die-cut from a sheet of a lighter and food-grade aluminum foil material using a lid-shaped mold.

Third, a very thin layer of food-safe adhesive (e.g., glue) is applied along the perimeter of the edge of the lid 908, excluding the handle.

Fourth, an empty capsule 900 is filled with a pre-measured food product, and then flushed with a food-safe noble gas or nitrogen gas, all in a multi-station, autonomous machine. The lid 908, when heat-sealed to the capsule 900, creates a hermetic seal that protects the food product in the capsule 900 from outside air, light, and moisture.

Figure 6:
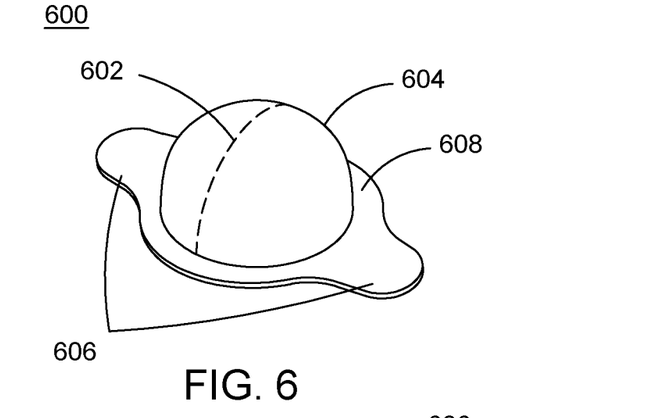
FIG. 6 depicts a perspective view of one illustrative embodiment of a seasoning pod.
Figure 7:
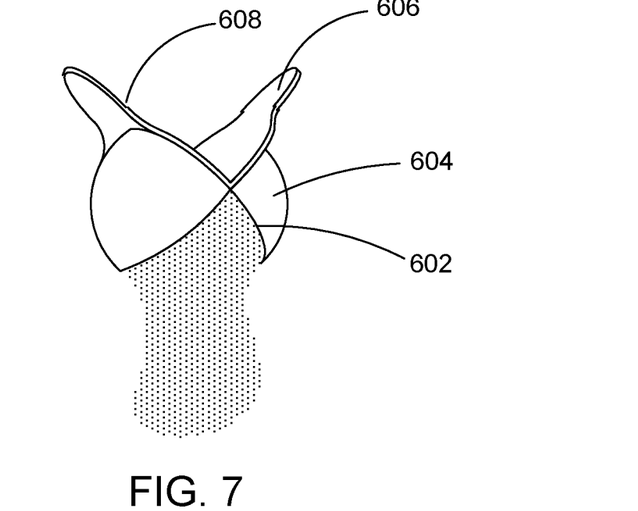
FIG. 7 depicts a perspective view of the seasoning pod as shown in FIG. 6 when seasoning inside the seasoning pod is falling out.

In an embodiment, referring to FIGS. 6 and 7, a food product package, e.g., a seasoning pod 600, includes a chamber 604 and two tab-shaped wings 606 extending from the bottom of the chamber. The seasoning pod 600 is configured in a physical shape that enables a one-handed "pinching" motion drawing together the two wings 606 extending from either side of the chamber 604. This motion generates a material rupture, or "pop," across a predetermined fault line 602 spanning a circumference of the chamber 604. This rupture dispenses the seasoning inside the seasoning pod 600 in a single step, which can be completed by the thumb and index finger of one hand. The user grasps two wings 606 of the seasoning pod using the thumb and the index finger of the same hand. The thumb and the index finger apply inward and upward pressure on two wings by pinching the two wings 606 toward each other. The bottom of chamber 604 flexes inward, and thus a force or torque is applied on a fault line 602 on the surface of chamber 604. When the force or torque is more than a predetermined threshold, the fault line 602 is ruptured. Accordingly, the seasoning inside the chamber 604 falls onto the meal below the chamber 604.

The seasoning pod 600 holds a pre-measured portion of seasoning or dry food product (e.g., spices, seasonings, flour, flakes, sugar, or coffee, etc.), allowing consumers to get an exact amount of a given ingredient that they need for eating, cooking, baking, or other general use or consumption.

In an embodiment, the chamber 604 can be of any shape, e.g., semi-sphere, semi-ellipsoid, cube, cuboid, etc. The chamber 604 is provided with a predetermined fault line 602 that is weaker than the rest of the chamber portion. The predetermined fault line 602 can cause a successful rupture when a predetermined force or torque is applied on the predetermined fault line 602. The chamber 604 is connected to the rest of the seasoning pod, which is a unified sheet 608 of an aluminum material having two "wings" 606. Either side of the sheet 608 is provided with a wing. The two wings 606 oppose each other, and are symmetrically positioned on two sides of the sheet 608. The two wings 606 can be pinched up and toward each other to create an appropriate leverage or torque needed to rupture the predetermined fault line 602 that is scored in the chamber 604 of the seasoning pod 600. In an embodiment, the unified sheet 608 having two wings 606 is flat. When the user pinches up the two wings 606, the two wings 606 flex toward each other, so that the back of the chamber 604 also flexes slightly inward to create the appropriate leverage or torque for rupture of the predetermined fault line 602. In another embodiment, the two wings 606 can be embodied as "levers" that are positioned at an angle to the back of the chamber 604. In another embodiment, the unified sheet 608 having two wings 606 is not flat, e.g., the unified sheet 608 can flex slightly inward or outward.

Figure 8:
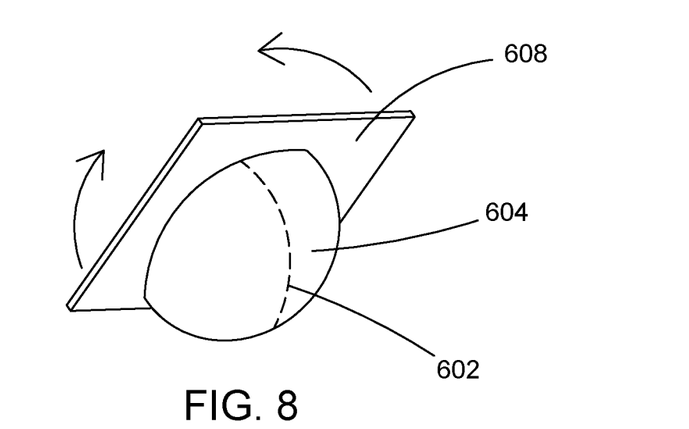
FIG. 8 depicts a perspective view of another illustrative embodiment of a seasoning pod.
Figure 9:
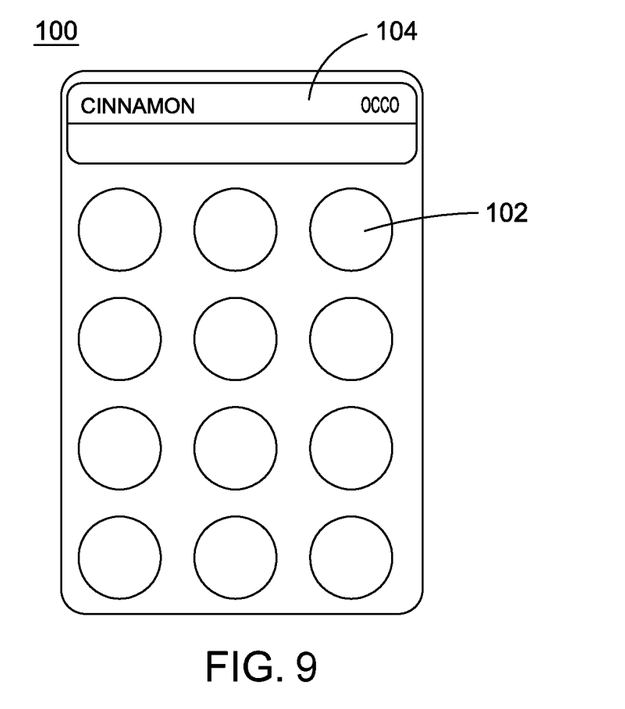
FIG. 9 depicts a front view of one illustrative embodiment of a package.
Figure 10:
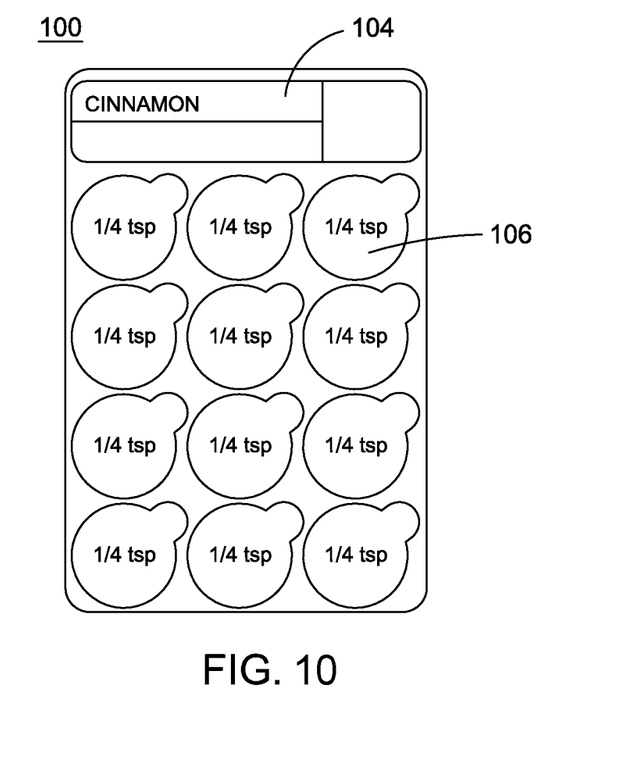
FIG. 10 depicts a rear view of one illustrative embodiment of a package.
Figure 11:
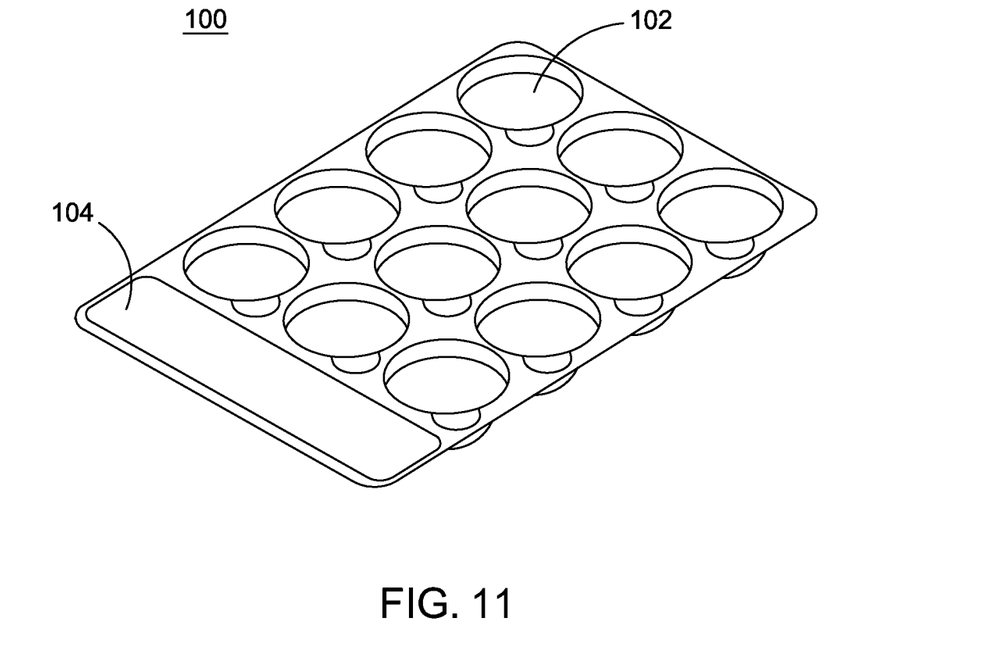
FIG. 11 depicts a rear perspective view of one illustrative embodiment of a package without peel-away lids.
Figure 12:
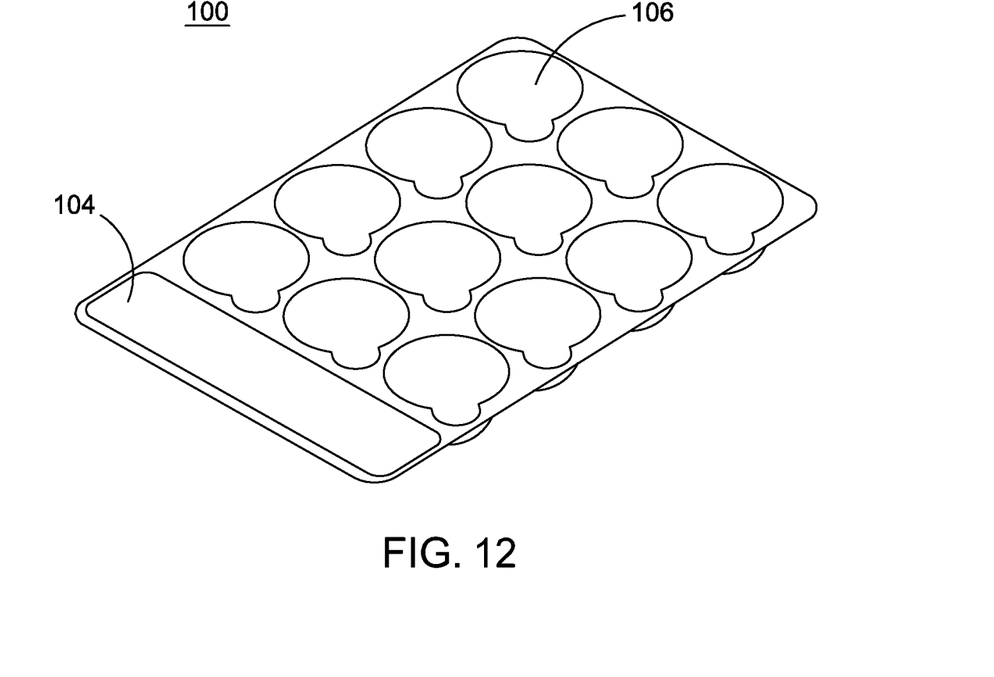
FIG. 12 depicts a rear perspective view of one illustrative embodiment of a package with peel-away lids.
Figure 13:
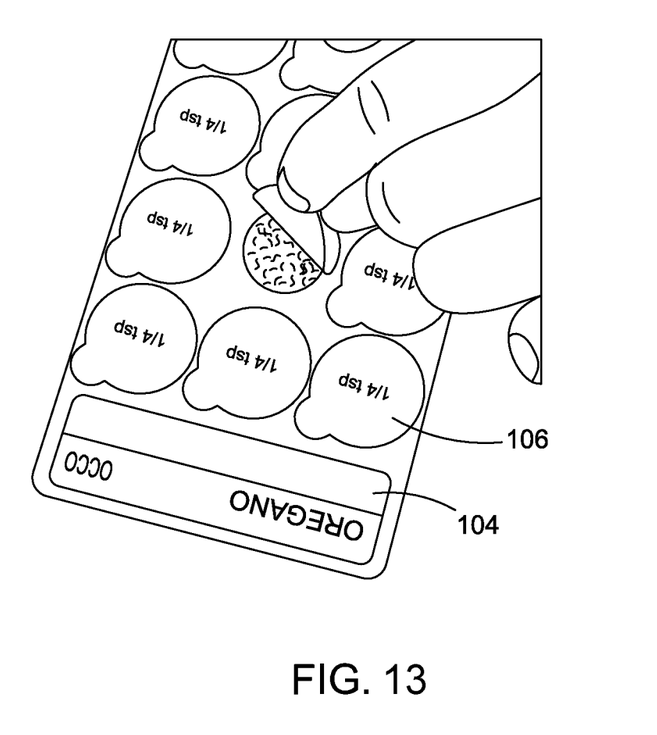
FIG. 13 depicts a rear view of one illustrative embodiment of a package, showing food inside a chamber.

The unified sheet 608 and the two wings 606 can be in different shapes. As shown in the embodiment of FIG. 8, the unified sheet 608 can be in the shape of a square, and the two wings are a part of the square. As shown in the embodiment of FIGS. 6 and 7, the unified sheet 608 can be in a shape of an approximate circle, with two extending tab-shaped wings.

In an embodiment, the seasoning pod is sealed with modified atmosphere packaging (MAP) technology to remove oxygen from the inside of a sealed pod, and keep the ingredient fresh until the consumer decides to use it. In this embodiment, a noble gas (e.g., argon gas, etc.) or nitrogen gas is introduced above the seasoning-filled chamber. Because noble gases and nitrogen are denser than air, the gas sinks down and displaces the oxygen in and around the seasoning, which minimizes the amount of oxygen packaged inside each chamber of seasoning. The package is then immediately sealed.

The seasoning pod as a whole can be of any size. Further, the chamber of the seasoning pod can be of any size or/and any color. In an embodiment, the chamber of the seasoning pod can accommodate equal to or up to ½ teaspoon (or a volume of 2.4645 cubic centimeters) of seasoning.

The seasoning pod can contain any seasoning or dry food product, such as coffee, tea, sugar, spices, seasonings, freeze-dried sauce, powdered milk, flour, etc. Any object in a form of a flake, a powder, or a grain, can be kept in the seasoning pod. Additionally, various household items, such as concentrated cleaning agents, detergents, etc. can also be kept in the seasoning pod.

The seasoning pod is made of an oxygen-proof, light-proof, and moisture-proof material, e.g., aluminum. Thus the seasoning inside the package is perfectly protected from oxygen, light, and moisture transmission that cause loss of freshness and flavor over time. The example material, e.g., aluminum, is sustainable and can be recycled an infinite number of times, without any material degradation in the recycling process. Meanwhile, the seasoning pod is sealed with MAP technology, which can further enhance shelf life while maintaining the quality of food, without preservatives.

Moreover, the chamber of the seasoning pod is a circular semi-sphere shape. With this circular semi-sphere shape, when the consumer plans to use the seasoning inside the chamber, the chamber can be emptied easily without seasoning residue getting stuck or clumped inside the chamber.

FIGS. 9-13 depict another illustrative embodiment of a package. In this embodiment, a food package (e.g., seasoning package) 100, in the shape of a card, is provided. The seasoning package 100 can be of any size, for example, 3×5 inches. The seasoning package 100 includes a plurality of chambers 102, each in the shape of a blister. Seasoning ingredients, such as spices, herbs, or condiments, etc. can be kept inside the chambers 102, and protected from oxygen, light, and moisture. In an embodiment, each seasoning package 100 can hold a different seasoning. For example, a first seasoning package holds cinnamon, while a second seasoning package holds basil. In an embodiment, a label 104 is attached to the seasoning package 100 to inform the customer which seasoning, for example, curry, cinnamon, or garlic, etc., is kept in this seasoning package 100. The label 104 can be attached to either the front side of the seasoning package or the rear side of the seasoning package. In an example, each of the front side and the rear side of the seasoning package 100 is attached with a label 104. In another embodiment, one seasoning package can have several different seasonings. For example, several chambers 102 of a seasoning package 100 hold fresh oregano, several chambers 102 of this seasoning package 100 hold fresh mustard, while the remaining chambers 102 of this seasoning package 100 hold fresh coriander. In another embodiment, each chamber 102 of one seasoning package 100 can have a different seasoning (i.e., the seasoning in each chamber 102 of a seasoning package is different), so that the user can have a variety of fresh seasonings in just one seasoning package 100.

In an embodiment, the seasoning package 100 is made of an oxygen-proof, lightproof, and moisture-proof material, e.g., aluminum. In an embodiment, the plurality of chambers 102 is formed on a unified sheet of aluminum. Each chamber 102 is independent of each other, so that the seasoning of a chamber is separate from that of other chambers. Each chamber 102 is sealed with an aluminum lid, thus creating a 360-degree perfect barrier seal against oxygen, light, and moisture. The chamber 102 can be of any size, e.g., ¼ teaspoon (or a volume of 1.23 cubic centimeters). When a user decides to use a chamber of seasoning for a dish, the aluminum lid can be removed by the user to expose one individual chamber 102 at a time, while the other chambers 102 are still kept sealed and away from oxygen, light, and moisture.

In an embodiment, each chamber 102 is flushed using modified atmosphere packaging (MAP) technology during the packaging process. MAP is a food packaging method that enhances shelf life by maintaining quality and retaining the original taste, texture, and look of the food, without preservatives. MAP describes a process by which a gas is applied to a food product in its open packaging, to displace the oxygen and thus retard or eliminate oxidation and bacterial growth of the food. In this embodiment, a food-safe noble gas or nitrogen gas is introduced above the seasoning-filled chambers. Because the nitrogen gas is denser than air, the nitrogen gas sinks down and displaces the oxygen in and around the seasoning, which minimizes the amount of oxygen packaged inside each chamber 102 of seasoning. The packaging is then quickly sealed.

In an embodiment, the seasoning package 100 is made of a unified sheet of an oxygen-proof, lightproof, and moisture-proof material, e.g., aluminum.

In an example, the seasoning package 100 includes twelve chambers, each of which holds a known quantity of a seasoning, e.g., a ¼ teaspoon (or a volume of 1.23 cubic centimeters) of seasoning, for a total of 3 teaspoons (or 1 tablespoon) of seasoning per package. The chambers 102 can be of any shape. In an embodiment, the chambers are a circular demi-sphere shape. The circular demi-sphere shape can be easily formed on the aluminum. With this circular demi-sphere shape, when the user plans to use the seasoning inside the chamber 102, the chamber 102 can be emptied without seasoning residue. In another embodiment, the chambers 102 are a cube shape. The chambers 102 protrude from one side of the package 100, with a peel-away lid 106 covering on the back of each chamber 102. The user can access the seasoning by pulling a small tab of the lid 106 and peeling away the lid of a chamber whenever the user is ready to use it. In this way, the user exposes only the exact amount of seasoning he/she needs at that moment to oxygen, moisture, and light, while the rest of the seasoning remains sealed away from the degrading factors (i.e., oxygen, moisture, and light).

The seasoning package 100, through the material of aluminum, MAP technology, and separate chambers, retards and eliminates three degrading factors (i.e., oxygen, light, and moisture) of freshness and flavor loss. The seasoning package 100 is designed to let the user only access one or more chambers 102 containing the exact amount of seasoning he/she needs, without opening or rupturing the other chambers 102 in the same package 100, thereby keeping the other chambers 102 for later use sealed up tight from the degrading factors (i.e., oxygen, light, and moisture). Further, the material of aluminum is a perfect gas, light, and moisture barrier, and ensures that no gas transmission occurs across the material of the package over time. Additionally, each chamber 102 of the seasoning package 100 is sealed using MAP technology, which is a manufacturing approach that uses gas to displace oxygen around each seasoning granule in each chamber 102. Thus, the seasoning package 100 can keep seasoning fresher and more flavorful at a molecular level, for a period of time far longer than the traditional 3-6 month freshness window of jars of seasoning.

The seasoning package 100 is easier to use than traditional jars of ground seasoning that require measuring spoons and thus additional storage space. With the seasoning package 100, the user is able to easily identify the amount of seasoning without a measuring spoon, because each chamber lid 106 may be marked with the amount of seasoning (e.g., ⅛, ¼, ½, ¾, 1, etc. teaspoon, tablespoon, etc.) in each chamber 102. The user can easily decide the number of required chambers of seasoning based on the recipe. The user can then administer the seasoning in the required chambers, and keep the remaining chambers 102 for later use.

Figure 14:
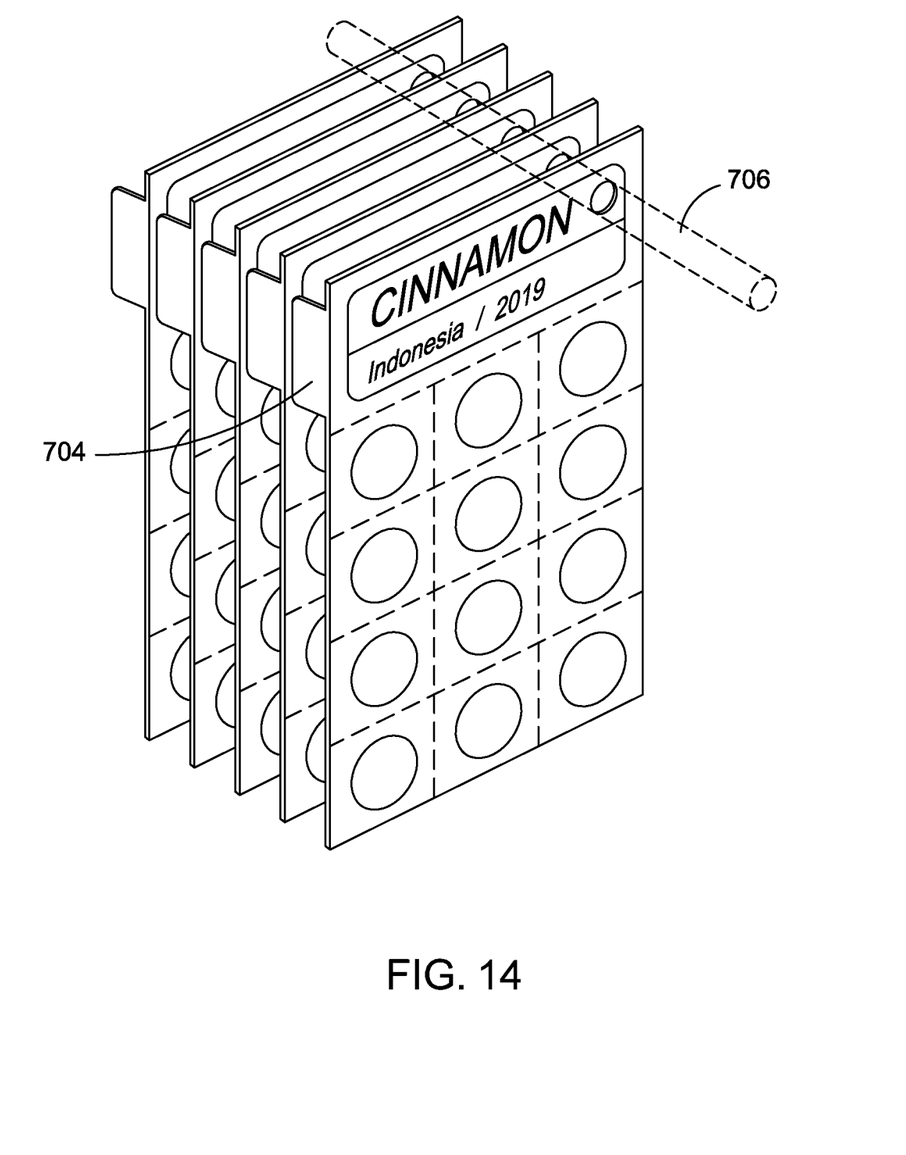
FIG. 14 depicts a rear perspective view of another illustrative embodiment of a package with an additional label.

Referring to FIG. 14, an additional label 704 is provided on a seasoning package 100. In an example, the additional label 704 is a tab extending from the seasoning package 100. The tab 704 is about 90-degree angle from the backside of the seasoning package 100, while the tab 704 is about a 270-degree angle from the front side of the seasoning package 100. In an embodiment, a plurality of seasoning packages 100 can be hung on a bar 706 installed in a kitchen for storage purpose.

In another embodiment, a different object, instead of seasoning, can also be kept in the package 100. For example, food products such as coffees, teas, freeze-dried sauces, powdered milk, etc., and various household items such as concentrated cleaning agents, detergents, etc. can be kept in the package 100. Any object in a form of a flake, a powder, or a grain, can be kept in the package 100.

In an embodiment, the seasoning package can be manufactured on a horizontal "form," "fill," and "seal" machine with the following steps. First, blister indentations are created on a plane of food-grade aluminum through the "coining" process. The "coining" process is used to conform aluminum to a die-cut built to the seasoning package 100's dimensions, for example, twelve chambers 102 pressed into an aluminum plane, which is then cut to 3×5 inches for one seasoning package. The number of chambers 102, the size of the seasoning package 100, and the size of each chamber 102, the shape of each chamber 102, and the shape of the seasoning package 100 can be changed without any limitation.

Second, once the seasoning package 100 is coined and cut, each chamber 102 is filled with a given seasoning, using a volumetric dispenser. For example, each chamber 102 can be filled with a unit dose of 1.23 cubic centimeters of any seasoning. The dose of seasoning in each chamber 102 can be changed without any limitation.

Third, after the seasoning package 100 is filled with seasoning, the MAP process starts. The seasoning package 100 is blanketed with a layer of food-safe nitrogen gas. The nitrogen gas is piped in above the seasoning and forms a plane of gas that sinks down and displaces the oxygen in and around the seasoning in each chamber, completely eliminating the presence of oxygen from each chamber 102.

Fourth, following the MAP process, each chamber 102 is sealed with an aluminum foil lid that isolates the seasoning in each chamber 102 completely from the exterior environment, so that exposure to oxygen, light, and moisture is avoided.

Fifth, the seasoning package 100 is then labeled with a sticker 104 that denotes the seasoning name, origin, and other required information. In an embodiment, the seasoning package 100 can be labeled through other approaches, for example, the required information can be directly provided, e.g., printed, on the labeling region of the seasoning package without a sticker 104.

The seasoning package 100 has various advantages. First, it is designed to lock in the freshness of flavor at a molecular level, ensuring that degrading factors leading to flavor decay and bacterial growth through essential oil evaporation and bacterial growth are minimized or removed. Thus, it allows the user to access a fresh, exceptionally flavorful seasoning, regardless of when the seasoning was purchased and when each chamber was opened.

Second, the seasoning package 100 allows the user to use an exact amount of seasoning he/she needs, without a measuring tool. The user just peels one aluminum lid 106 away and puts the seasoning into the dish. Compared with traditional jars of seasoning, the seasoning package 100 is also easily organized and stored.

Third, the seasoning package 100 allows the user to purchase and use just the amount of seasoning he/she needs for a given recipe or meal, and is designed to keep the seasoning fresher for a longer period. Instead of purchasing a traditional jar that will lose flavor relatively quickly, the seasoning package 100 allows the user to purchase a small amount of seasoning and keep it molecularly fresher until the intended date of use.

Fourth, the seasoning package 100 is made of the most recyclable material, i.e., aluminum. Aluminum can be recycled continuously without material degradation. Aluminum can be melted down and reused an infinite number of times with no impact on the functionality of the material.

The present description may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one may also be present. That is, these terms/phrases are not intended to limit the description to a single feature/element being present or require that a plurality of such features/elements be present. To the contrary, these terms/phrases only require at least a single feature/element with the possibility of a plurality of such features/elements being within the scope of the description.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems and processes may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention.

We claim:

1. A package for a product, comprising:
   a capsule body comprising an oxygen-proof, lightproof, and moisture-proof material configured to accommodate a single-use predetermined amount of a dry food product, wherein the single-use predetermined amount of the dry food product is within the capsule body;

a food-safe gas denser than air within the capsule body to displace oxygen in and around the dry food product;

a handle connected to one side of the capsule body; and a lid comprising the oxygen-proof, lightproof, and moisture-proof material, wherein the capsule body is sealed with the lid using a food-safe adhesive to form a hermetic seal that protects the dry food product in the capsule body from outside air, light, and moisture.

2. The package of claim 1, wherein the handle comprises the oxygen-proof, lightproof, and moisture-proof material.

3. The package of claim 2, wherein the material is aluminum.

4. The package of claim 1, wherein the dry food product is seasoning.

5. The package of claim 1, wherein the handle includes a recess having a shape of a dome, configured to receive a portion of a thumb of a user.

6. The package of claim 1, wherein the lid includes a peel tab, extending outwards on top of the handle and past an end of the handle to form an overhang portion.

7. The package of claim 1, wherein a bottom of the capsule body is flat.

8. The package of claim 1, wherein the capsule body and the lid are sealed using a modified atmosphere packaging technique.

9. The package of claim 1, wherein the dry food product has a form selected from a group consisting of a flake, a powder, and a grain.

10. The package of claim 1, wherein the food-safe gas is nitrogen.

11. A seasoning package, comprising:
a capsule body comprising an oxygen-proof, lightproof, and moisture-proof material configured to accommodate a single-use predetermined amount of a dry seasoning, wherein the single-use predetermined amount of the dry seasoning is within the capsule body;

a food-safe noble gas within the capsule body to displace oxygen in and around the dry seasoning;

a handle connected to one side of the capsule body; and a lid comprising the oxygen-proof, lightproof, and moisture-proof material, wherein the capsule body is sealed with the lid using a food-safe adhesive to form a hermetic seal that protects the dry seasoning in the capsule body from outside air, light, and moisture.

12. The seasoning package of claim 11, wherein the handle comprises the oxygen-proof, lightproof, moisture-proof and sustainable material.

13. The seasoning package of claim 12, wherein the material is aluminum.

14. The seasoning package of claim 11, wherein the handle includes a recess having a shape of a dome, configured to receive a portion of a thumb of a user.

15. The seasoning package of claim 11, wherein the lid includes a peel tab, extending outwards on top of the handle and past an end of the handle to form an overhang portion.

16. The seasoning package of claim 11, wherein a bottom of the capsule body is flat.

17. The seasoning package of claim 11, wherein the capsule body and the lid are sealed using a modified atmosphere packaging technique.

18. A seasoning package, comprising:
a capsule body comprising an oxygen-proof, lightproof, and moisture-proof material configured to accommodate a single-use predetermined amount of a dry seasoning, wherein the single-use predetermined amount of the dry seasoning is within the capsule body;

a food-safe noble gas within the capsule body to displace oxygen in and around the dry seasoning;

a handle connected to one side of the capsule body; and a lid comprising an oxygen-proof, lightproof, and moisture-proof material, wherein the capsule body is sealed with the lid using a food-safe adhesive to form a hermetic seal that protects the dry seasoning in the capsule body from outside air, light, and moisture, wherein the capsule body, the handle, and the lid are made of aluminum, wherein the lid includes a peel tab, extending outwards on top of the handle and past an end of the handle to form an overhang portion.

19. The seasoning package of claim 18, wherein the handle includes a recess having a shape of a dome, configured to receive a portion of a thumb of a user.

20. The seasoning package of claim 19, wherein a bottom of the capsule body is flat.

* * * * *